United States Patent [19]

Shacklette et al.

[11] Patent Number: 5,011,748

[45] Date of Patent: Apr. 30, 1991

[54] RECHARGEABLE BATTERY CATHODE FROM P2- PHASE SODIUM COBALT DIOXIDE

[75] Inventors: Lawrence W. Shacklette, Maplewood; Linda B. Townsend, Sparta; Taiguang R. Jow, Morris, all of N.J.

[73] Assignee: Allied-Signal, Morris Township, Morris County, N.J.

[21] Appl. No.: 350,967

[22] Filed: May 12, 1989

Related U.S. Application Data

[63] Continuation-in-part of Ser. No. 112,847, Oct. 23, 1987, abandoned.

[51] Int. Cl.$^5$ ............................................. H07M 4/52
[52] U.S. Cl. ...................................... 429/50; 429/217; 429/218
[58] Field of Search ......................... 429/217, 218, 50

[56] References Cited

U.S. PATENT DOCUMENTS

| | | | |
|---|---|---|---|
| 4,550,064 | 10/1985 | Yen et al. | 429/94 |
| 4,695,521 | 9/1987 | Shacklette et al. | 429/213 X |
| 4,780,381 | 10/1988 | Shacklette et al. | 429/217 X |

OTHER PUBLICATIONS

Yao et al., *Journal of Electroanalytical Chemistry*, vol. 223, pp. 107-117 (1987).
Liu et al. *Extended Abstracts of Battery Division;* The Electrochemical Soc., Inc.; Oct. 1989; Abs. No. 66.
Shacklette et al., *Journal of the Electrochemical Society*, vol. 135, No. 11, pp. 2669-2674, 11/88.
Delmas et al., "Electrochemical Intercalation of Sodium in $Na_xCoO_2$ Bronzes", *Solid State Ionics* 3/4 (1981) pp. 165-169.

*Primary Examiner*—Stephen J. Kalafut
*Attorney, Agent, or Firm*—R. C. Stewart, II; G. H. Fchs; D. L. Webster

[57] ABSTRACT

This invention relates to a novel cathode for use in batteries, and to batteries containing the cathode, which cathode comprises cobalt dioxide in the P2 phase.

37 Claims, No Drawings

RECHARGEABLE BATTERY CATHODE FROM P2-PHASE SODIUM COBALT DIOXIDE

RELATED APPLICATION

This application is a continuation-in-part of U.S. Patent Application Ser. No. 112,847, filed Oct. 23, 1987, now abandoned.

BACKGROUND OF THE INVENTION

1. Field of the Invention

This invention relates to positive battery electrodes composed of sodium cobalt dioxide. More particularly, this invention relates to such electrodes in which the cobalt dioxide is in the P2 phase and to batteries comprising such electrodes.

2. Prior Art

The use of elastomeric binders for cathodes are known. For example, S P.S. Yen, et al., "Elastomeric Binders for Electrodes", *J. Electrochem. Soc.*, 130p. 1107 (1983) describes the use of ethylene propylene diene terpolymer as a binder for cathodes. In particular, cathodes for which elastomers are useful as binders are finely divided alkali metal intercalation compounds. Examples of intercalation compounds are found in European Patent No. 0070107 Al; MurPhy et al., *J. Electrochem. Soc.*, 126, 349 (1979) and Murphy et al., *Mat. Res. Bull.*, 13, 1395 (1978) which disclose batteries based on lithium intercalation in layered dichalcogenides.

Negative electrodes for non-aqueous batteries composed of alkali metal alloys are known. For example, U.S. Pat. No. 4,002,492 discloses electrochemical cells having an anode consisting essentially of lithium aluminum that contain lithium in amounts between about 63 and 92 percent by weight and the balance essentially aluminum. Anodes composed of lithium and aluminum are also disclosed in Rao et al., *J. Electrochem. Soc.*, 124, 1490 (1977), and Besenhard, *J. Electroanal. Chem.*, 94. 77 (1978). Negative electrodes containing alloys of sodium are disclosed in U.S. Pat. No. 4,668,596 of Shacklette et al. and U.S. Pat. No. 4,753,858 of Jow.

Conjugated backbone polymers, e.g., polyacetylene, polyphenylene, polyacenes, polythiophene, poly(phenylene vinylene), poly(furylene vinylene), poly(thienylene vinylene), polyazulene, poly(phenylene sulfide), poly(phenylene oxide), polythianthrene, poly(phenylquinoline), polyaniline, polythiophene, and polypyrrole, have been suggested for use in a variety of applications based upon their characteristic of becoming conductive when oxidized or reduced either chemically or electrochemically. The secondary battery application described by, e.g., MacDiarmid et al. in U.S. Pat. No. 4,321,114 (1981); *J. de Physique Colloque* C3, Vol. 44 (1983), articles beginning on page 579, page 615 and page 537; and K. Kaneto et al., *Japanese J. of Applied Physics*, Vol. 22, pp. L567-L568 (September 1983) and pp. L412-L414 (July 1983), employs one or more electrodes having conjugated backbone polymers as the electroactive material. Such electrodes can, for example, be reversibly complexed with alkali metal or tetraalkylammonium cations during battery cycling, most commonly with insertion of cations into a polymer anode (the negative battery electrode) occurring during charging The more such cations are inserted, the more conductive the electrode becomes and the more cathodic the potential of the anode becomes.

Various studies have been made on sodium cobalt dioxide and the electrochemical intercalation of sodium. Illustrative of these studies are those described in J. Molenda et al., "Transport Properties of $Na_xCoO_{2-y}$", *Solid State Ionics*, 12 pp. 473-477 (1984); Claude Fouassier et al. "Sur de Nouveaux Bronzes Oxygenes de Formule $Na_xCoO_2$ (x—1). Le Systeme Cobalt-Oxygene-Sodium", *Journal of Solid State Chemistry*, 6, pp. 532-537 (1973); S. Kikkawa et al., "Electrochemical Aspects of the Deintercalation of Layered $AMO_2$ Compounds", *Journal of Power Sources*, 14, pp. 231-234 (1985); Claude Delmar et al. "Electrochemical Intercalation of Sodium in $Na_xCoO_2$ Bronzes", *Solid State Ionics*, 3/4, pp. 165-169 (1981); and Jean-Jacques Braconnier et al., "Comportement Electrochemique Des Phases $Na_xCoO_2$", *Mat. Res. Bull.*, 15, pp. 1797-1804 (1980).

Composite structures of a conjugated backbone polymer and a non-electroactive material have been described in U.S. Pat. No. 4,294,304 and in the above *J. de Physique* issue, articles beginning on page 137 and on page 151. Representative other components that have been blended with polyacetylene or onto which polyacetylene or polypyrrole have been deposited include polyethylene, polystyrene, graphite, carbon black, NESA glass and silicon. In selected instances, such composite structures have been suggested for use in batteries, see Showa Denko K. K., European published Patent Application No. 76,119 (1982).

Each of U.S. Pat. Nos. 4,668,586 and 4,695,521 are directed to anodes and to batteries containing the anodes. The anodes comprise a mixture of a conjugated backbone polymer and another electroactive material selected from the group consisting of metals which alloy with alkali metals such as aluminum and lead, and alkali metal cation insertion materials such as transition metal chalcogenides. U.S. Pat. Nos. 4,668,596 and 4,695,521 also describe cathodes comprised of sodium cobalt dioxide. Moreover, L. W. Shacklette and T. R. Jow, "Rechargeable Electrodes From Sodium Cobalt Bronzes", *Electrochemical Soc.* Abstract No. 64, Honolulu, Oct. 18-23, (1987) and T. R. Jow and L. W. Shacklette, *Electrochem. Soc.*, Abstract No. 67, Honolulu, Oct. 18-23, (1987) "A Rechargeable Cell Based on a Conductive Polymer Alkali-Metal Alloy Composite Electrode" described the use of sodium cobalt dioxide electrodes.

SUMMARY OF THE INVENTION

This invention relates to a novel cathode comprising $Na_xCoO_2$ in the P2 phase, wherein said $Na_xCoO_2$ is characterized in that during the charge/discharge cycle of a secondary battery comprising said cathode to 3.5 V vs. Na/Na+, x varies such that the change in x, $\Delta x$, during the charge/discharge cycle is greater than about 0.37 and such that the semiempirical energy density of said battery is greater than about 260 Wh/Kg. This invention also provides a battery incorporating the cathode of this invention, which battery comprises:

(a) an anode;

(b) an electrolyte comprising an organic solvent and one or more alkali metal salts, preferably at least one of which is a sodium salt; and (c) a cathode comprising $Na_xCoO_2$ in the P2 phase, wherein said $Na_xCoO_2$ is characterized in that during the charge/discharge cycle of said battery to 3.5 V vs. Na/Na+, x varies such that $\Delta x$ during the charge/discharge cycle is greater than about 0.37 and such that the energy density of said battery is greater than about 260 Wh/Kg.

A particularly preferred embodiment of the battery of this invention comprises:

(a) a cathode comprising $Na_xCoO_2$ in the P2 phase wherein said $Na_xCoO_2$ is characterized in that during the charge/discharge cycle of said battery to 3.5 V vs. Na/Na+, x varies such that $\Delta x$ during the charge/discharge cycle is greater than about 0.37 and such that the energy density of said battery is greater than about 260 Wh/Kg;

(b) an electrolyte comprising an organic solvent and a sodium salt; and (c) an anode comprising one or more anode active materials selected from the group consisting of sodium metal, conjugated backbone polymers capable of inserting sodium metal cations, conjugated backbone copolymers capable of inserting sodium metal cations, blends of said conjugated backbone polymers or copolymers with one or more non-conjugated backbone polymers, metals capable of alloying with the sodium metal cations in said electrolyte and sodium-ion insertion materials capable of inserting sodium metal cations in said electrolyte; said sodium metal cations being introduced into said anode as a metal alloy or as an inserted ion in said cation inserting material, polymers or copolymers during the charging of said battery.

Surprisingly, it has been discovered that batteries having cathodes comprised of sodium cobalt dioxide ($Na_xCoO_2$) in the P2 phase exhibit better reversibility capacity, cycle life and better energy efficiencies as compared to batteries in which the cathode is sodium cobalt dioxide described in the prior art such as C. Delmar, J. J. Braconnier, C. Fouassier, and P. Hagenmuller, Solid State Iionics, 3/4, 165 (1981). Moreover, the batteries exhibit better cycle life and better energy efficiencies as compared to batteries in which the cathode is sodium cobalt dioxide in other phases as for example the 03, 0'3, P3 and P'3 phases.

DESCRIPTION OF THE PREFERRED EMBODIMENTS

As an essential component, the battery of this invention includes a cathode comprising $Na_xCoO_2$ in the P2 phase. The $Na_xCoO_2$ for use in the cathode of the battery of this invention has properties which are different from those heretofore described in the prior art as for example in C. Delmar, J. J. Braconnier, C. Fouassier and P. Hagenmuller, Solid State Ionics, 3/4, 165 (1981). For example, in the battery of this invention during the discharge cycle $\Delta x$ is greater than about 0.37 and such that the energy density of said battery is greater than about 260 wh/Kg. In contrast, during a single discharge/charge cycle in C. Delmar et al. x varied from 0.46 to 0.83, $\Delta x$ equaled 0.37, and the energy density was equal to 260 Wh/Kg. In the preferred embodiments of the invention during the charge/discharge cycle $\Delta x$ can vary from about 0.40 I0.02 to about 0 66 I0.02 and the energy density can vary from about 280 Wh/Kg to about 462 Wh/Kg. In the particularly preferred embodiments of this invention during the charge/discharge cycle $\Delta x$ may vary from about 0.40 I0.02 to about 0.60 I0.02 and the energy density of the battery can vary from about 280 Wh/Kg to about 462 Wh/Kg. In the most preferred embodiments of this invention where enhanced reversibility, cycle life and capacity are desired during the charge/discharge cycle $\Delta x$ is about 0.42 +=0.02 and the energy density is about 283 wh/Kg.

The P2 phase sodium cobalt dioxide used in the practice of this invention may contain only intercalated sodium cations, or may be cointercalated by other alkali metal cations such as $Li^+$, $K^+$, $Rb^+$, $Cs^+$ to form compositions such as $Na_xK_yCoO_2$, or $Na_xRb_yCoO_2$ where $x+y<1$.

Cobalt dioxide in the P2 phase and methods for its production are well known in the art and will not be described herein in great detail. Illustrative of useful procedures are those described in J. Molenda, C. Delmas, P. Dordor, and A. Stoklosa, Solid State Ionics, 12, p. 473 (1984); and A. Stoklosa, J. Molenda and D. Than, Solid State Ionics, 15, p. 211 (1985) which are incorporated herein by reference.

Sodium cobalt dioxide in the P2 phase ($Na_xCoO_2$) with specific values of x greater than about 0.4 can be prepared in accordance with the following:

$$2\ Co_3O_4 + 3xNa_2O_2 \rightarrow 6\ Na_xCoO_2 + (3x-2)O_2$$

where the reaction is carried out at a temperature of greater than 650°C and preferably greater than 700° C. over a 24 hour period in flowing dry air and/or pure oxygen after thorough grinding, mixing and finally pelletizing of the reactants. Alternatively, cobalt dioxide in the P2 phase can be prepared by carrying out the reaction at a temperature within the range of from 400° C. to 600° C. to produce sodium cobalt dioxide ($Na_xCoO_2$ where x is greater than about 0.4, preferably from about 0.4 to about 1 in the 03, 0'3, P3 or P'3 phase, followed by heating at a temperature greater than 650° C. for an extended period of time, i.e. 12h.

Sodium cobalt dioxide in the P2 phase can alternatively be prepared via the reactions:

$$2Co_3O_4 + 3xNa_2CO_3 + (2 - 1.5x)O_2 \xrightarrow{T > 700° C.} 6Na_xCoO_2 + 3xCO_2$$

and, $$2Co_3O_4 + 3xNa_2O + (2 - 1.5x)O_2 \xrightarrow{T > 650° C.} 6Na_xCoO_2$$

where $0.5 < x < 1$.

Preparation of P2-phase sodium cobalt oxide at a temperature between 750° C. and 800° C. in dry oxygen by reaction above from cobalt (II, III) oxide and sodium carbonate is preferred.

The cathode may also include other optional materials known to those of skill in the battery art. These materials will not be described in great detail. In brief, by illustrative examples, the cathode may include such other substituents as conductivity aids as for example, carbon black and doped electrically conductive conjugated backbone polymers such as oxidized polyacetylene, poly(p-phenylene), polyaniline, polypyrrole, polyacenes, poly(phenylene vinylene), polyazulene, polynaphthalene, poly(phenylene sulfide) poly(phenylene oxide), polyphenothiazine. polythiophene, polythianthrene, and substituted versions thereof; and other sodium cation insertion materials such as $Na_xTiS_2$, $Na_xNbS_2Cl_2$, $Na_xWO_{3-y}$, $Na_xV_{0.5}Cr_{0.5}S$, $Na_xMoS_3$, (amorphous) and $Na_xTaS_2$, wherein $0<x<2$, and $0<y<1$. Other substituents include binders such as halocarbons and elastomeric hydrocarbons prepared by polymerization of alkenes having two or more double bonds that are either conjugated or non-conjugated, alone or with one or more other copolymerizable ethylenic monomers such as isobutylene, ethylene-propylene-butadiene copolymers, polybutadiene, poly(butadiene-co-styrene), polyethylene, propylene-trifluoroethylene copolymer and poly(tetrafluoroethylene); mechanical supports; current collectors and the like. In the preferred embodiments of the invention, the cathode includes one or more binders and one or more conductivity aids. The preferred binders are poly(tetrafluoroethylene) and ethylene-propylene-butadiene copolymers.

The amount of cobalt dioxide in the cathode can vary widely, depending on a number of factors as or example, the desired energy density, the desired rate of charge and discharge, the cell design, (whether prismatic, round or flat), and the like. In general, the amount of cobalt dioxide should be at least 50 percent by weight of the positive electrode. In the preferred embodiments of this invention in which the cathode also includes a binder and a conductivity aid, the amount of cobalt dioxide in the cathode may vary from about 60 to about 100 percent by weight, the amount of binder is from about 10 to about 8 percent by weight, and the amount of conductivity aid is from about 6 to about 12 percent by weight based on the total weight of cobalt dioxide, binders and conductivity aids in the cathode. In the particularly preferred embodiments of the invention, the amount of cobalt dioxide is from about 85 to about 92 percent by weight, the amount of binders if from about 2 to about 7 percent by weight, and the amount of conductivity aid is from about 6 to about 8 Percent by weight on the aforementioned basis.

In the preferred embodiments of the invention, the cathode is composed of an intimate mixture of compressed powders. In the preferred embodiments where the cathode is composed of powdered sodium cobalt dioxide dispersed in elastomer or halocarbon binder, the cathode is generally fabricated by mixing a slurry of powdered sodium cobalt dioxide in a solution or dispersion of an elastomer or a halocarbon dissolved or dispersed in a chemically compatible solvent; casting the slurry in a mold or spray coating the slurry on a substrate and removing the solvent; and compressing the composite for improved cohesiveness and uniformity.

As another essential component, the battery of this invention includes an electrolyte comprising an organic solvent and a salt. Organic solvents which may be included in the electrolyte of the batteries of the present invention may vary widely and can be organic solvents normally used in batteries. Preferably, these solvents should be electrochemically inert to oxidation and reduction during use while simultaneously being capable of dissolving the desired alkali metal salt and providing ionic conductivity equal to or in excess of $10^{-4}$ S/cm. Examples of such useful organic solvents include propylene carbonate, ethylene carbonate, solfolane, methyl sulfolane, dimethyl sulfolane, 3-methyl-2-oxazolidone, alkene sultones, e.g., propane sultone, butane sultone (the use of sultones as electrolyte compositions is the subject of a related, commonly assigned U.S. Patent No. 4,528,254, and the use of sultones for coatings on polymer anodes is the subject of a related, commonly assigned U.S. Pat. No. 4,472,489), dimethYl sulfoxide (DMSO), dimethyl sulfite, tetrahydorfuran (THF), 2-methyltetrahydrofuran (2-MTHF), dioxane, dioxolane, 1,2-dimethoxyethane (DME), dimethoxymethane, diglymes, glymes, methyltetrahydrofurfuryl ether, anisole, nitriles, (e.g., proprionitrile, butyronitrile, acetonitrile, benzonitrile), dichloromethane, tetraethylsulfamide, aromatic hydrocarbons, e.g., toluene, benzene, organo Phosphorus compounds, e.g., hexamethylene phosphoramide, and trimethyl phosphate. Mixtures of such available organic solvents may also be used, such as mixtures of sulfolane and acetonitrile, or mixtures of propylene carbonate and dimethoxyethane.

The organic solvents chosen for use in any particular situation will, of course, depend upon many factors such as the precise electrolyte composition used and the voltage range desired, as well as the choice of an anode and other components of the battery used. In the preferred embodiments of the invention when the anode contains a conjugated polymer, ether-type solvents such as tetrahydrofuran, dimethoxyethane, diglyme, 2-methyltetrahydrofuran, methyltetrahydrofurfuryl ether and mixtures thereof are employed because these solvents are generally not reactive with conjugated backbone polymers, when in their neutral or reduced forms.

The electrolyte includes an alkali-metal compound which is ionizable during the operation of the cell into an anionic and a cationic species The alkali-metal cations of such electrolytes may, depending on the nature of the anode active material, plate out in the zero valent state, insert into the conjugated backbone polymer or inorganic material, or form a metal alloy with anode active metals during the operation of the battery For example, upon operation of a cell using a conjugated backbone polymer as all or part of the negative electrode, the polymer becomes doped with a cationic dopant species to a conductive n-type material. A wide variety of ionizable compounds for forming anionic and cationic species may be suitably employed, either individually or in combination, provided that at least a portion of the compounds will ionize into a sodium carbon. Illustrative of such materials are the salts of alkali metals with anions such as for example, halides, $PF_6^-$, $ClO_4^-$, $AlCl_4^-$, $FeCl_4^-$, $SO_3CF_3^-$, $BF_4^-$, $BCl_4^-$, $NO_3^-$, $POF_4^-$, $SCN^-$, $CN^-$, $AsF_6^-$, $CF_3CO_2^-$, $SbF_6^-$, $C_6H_5CO_2^-$, $p\text{-}CH_3C_6H_4SO_3^-$, $HSO_4^-$, $B(C_6H_5)_4^-$ and the like salts of such metals In the preferred embodiments of this invention, where the anode is a composite comprised of one or more conjugated backbone polymers and one or more electroactive materials selected from the group consisting of metals which alloy with alkali metals and alkali metals cation inserting materials, salts for use in the electrolyte of the preferred battery of this invention are of the formula:

$$NaA$$

wherein:

Na is sodium; and

A is a species which is anionic in the electrolyte and stable under operational conditions. Suitable anionic species include $I^-$, $Br^-$, $Cl^-$, $ClO_{10_4}^-$, $PF_6^-$, $AsF_6^-$, $SP_3CF_3^-$, $BF_4^-$, $BCl_4^-$, $AlCl_4^-$, $SbF_6^-$ arylborates and alkylarylborates such as $B(CH_3)_4^-$, $B(C_6H_5)_4^-$, and their fluorinated derivatives and the like (the use of such borate salts with conjugated polymers being the subject of commonly assigned U.S. Pat. No. 4,522,901 which is incorporated herein by reference). Preferred anions are $PF_6^-$, $ClO_4^-$, $Br^-$, $SO_3CF_3^-$, and $BF_4^-$, with $PF_6^-$ being the anionic sPecies of choice.

Molten salts may also be employed as the electrolyte of the battery of this invention. The use of conjugated polymers as anodes in room-temperature molten salt batteries is described in the commonly assigned U.S. Pat. No. 4,463,071, which is incorporated herein by reference. Since in many cases the polymers, alloys, and other ion inserting materials of this invention are stable at elevated temperature, intermediate temperature molten salts (M.P. <200° C.) such as $NaAlCl_4$ or $KAlCl$, are also suitable for use.

As another essential component, the battery of this invention includes an anode. The anode active material may vary widely and will usually be an alkali metal or an alkali metal insertion material. In the preferred embodiments of the invention, the anode for use in the practice of this invention comprises one or more anode active materials selected from the group consisting of sodium metal, alloys of sodium and one or more metallic or non-metallic materials, conjugated backbone copolymers and polymers capable of inserting sodium metal cations in the electrolyte and blends of said conjugated backbone polymers or copolymers and one or more non conjugated backbone polymers or copolymers, inserting materials capable of inserting sodium cations in the electrolyte. During the charging of this battery, the sodium cations are plated as sodium metal, or are introduced into the anode as an alloy or as an inserted cation in the cation inserted material, polymers or copolymers. Illustrative of useful anodes are those described in U.S. Pat. No. 4,695,521 and U.S. Pat. No. 4,668,596.

Useful alloys include those formed with alkali metals especially sodium metals and one or more other metals which are caPable of being de-alloyed and re-alloyed by electrochemical oxidation and reduction, respectively, in the presence of alkali metal salt electrolytes. Illustrative of such useful alkali metal alloying metals are lead, tin, bismuth, antimony, tellurium, silicon, thallium, selenium, gold, arsenic, cesium, indium, gallium, cadmium, mercury, and alloys of these or other metals, such as PbSn or Wood's Metal (Bi—Pb—Sn—Cd) and the like. The preferred alkali metal alloying metals for use in the practice of this invention are those which are readily alloy with sodium metal such as antimony, bismuth, selenium, gallium, tellerium, indium, cadmium, lead, tin and alloys thereof; and most preferred are tin, lead, bismuth and/or antimony The mole ratios of the components of the alloy can vary widely, depending on permissible ratios based on allowed interactions between the components and the desired capacity of the anode. In general, since sodium is the electroactive material in the anode, the greater the mole percent of sodium in the anode, the greater the capacity of the anode; and conversely, the lower the mole ratio of sodium in the anode, the lower the capacity. In general, since higher capacities are desirable, higher amounts of sodium in the alloy are desirable Sodium as compared to lithium is readily adaptable to provide such high capacity or alloys such as $Na_5Pb_2$, $Na_{15}Pb_4$, $Na_5Sn_2$, and $Na_{15}Sn_4$ which have higher sodium content. In the preferred embodiments of the invention, the mole ratio of sodium to other components in the alloy is about equal to or greater than about 0.5 to about 1. In these preferred embodiments, the upper amount of sodium in the alloy is the greatest amount of sodium which can be alloyed with the other component or components before pure metallic, unalloyed sodium is formed. In the Particularly preferred embodiments of the invention, the mole ratio of sodium to the other components in the alloy will usually vary from about 1 to about 1 to about 5 to about 1, and in the most preferred embodiments will vary from about 4 to about 1 to about 1 to about 1.

The method of manufacturing the alloy is not critical and can vary widely. Conventional alloying procedures are readily adaptable for use in the practice of this invention. For example, such alloys can be formed electrochemically by Plating sodium onto a substrate of the other components as described in more detail in N. N. Tomashova, I. G. Kieseleva and B. N. Kabanov, *Electrochemical*, Vol. 8, p. 112 (1972) which is incorporated herein by reference. Sodium alloys can also be prepared metallurgically by melting appropriate amounts of sodium and other components in an inert atmosphere as described in more detail in R. Kremann and P. V. Reininghaus, Z. *Metalkunde*, Vol. 12, p. 273 (1920) which is hereby incorporated by reference.

Useful cation inserting polymers may be any of the variety of conjugated backbone polymers known to those of skill in the art for use as negative electrodes in batteries. Such polymers are preferably conductive in their reduced form and capable of reversibly inserting cations Among such conjugated backbone polymers, polyacetylene, poly(phenylene vinylene) and poly(p-phenylene) are preferred, and polyacetylene and poly(p-phenylene) are particularly preferred.

Useful conjugated backbone polymers are known compounds which can be prepared by conventional means. For example, high quality polyacetylene, a preferred conjugated backbone polymer, can be conveniently prepared by the procedures described in a series of papers by Shirakawa, et al., *Polymer Journal*, Vol. 2, No. 2, pp. 231–244 (1971); *Polymer Journal*, Vol. 4, No. 4, pp. 460–462 (1973); *Journal of Polymer Science Part A1*, Polymer Chemistry Edition, Vol. 12, pp. 11–20 (1974), and *Journal of Polymer Science Part A-1*. Polymer Chemistry Edition, Vol. 13, pp. 1943–1950 (1975), all of which are incorporated herein by reference. Moreover, forms of high quality poly(p-phenylene), another preferred conjugated backbone polymer, can be prepared by the method of Kovacic described in detail in *J. Am. Chem. Soc.* 85, 454–458 (1963), incorporated herein by reference. Furthermore, poly(phenylene vinylene), another preferred conjugated backbone polymer, can be Prepared by the procedure described in U.S. Pat. No. 3,404,132 of *R. A. Wessling et al.*

The anode may include other optional materials known to those of skill in the battery art. These materials are known to those of skill in the art and will not be described herein in great detail. In brief, by way of illustrative examples, the anode may include such other substituents as binders and conductivity aids, listed below for use in the cathode, mechanical supports, and the like. However, in the preferred embodiments, the combination of polymer plus other electroactive materials is in the major proportion.

The preferred anodes of this invention comprise an elastomer or halocarbon binder and one or more anode active materials selected from the group consisting of sodium metal alloy, and conjugated backbone polymers and copolymers. The more preferred anodes comprise a combination of an elastomer binder with a conjugated backbone polymer and a sodium alloy. The particular elastomer, conjugated backbone polymer and alloying metal chosen for use in any particular situation may vary widely. However, in the preferred embodiments of the invention, the conjugated backbone polymer and sodium alloys are selected such that the range of electroactivity of the polymer encompasses or closely matches that of the alloy. The elastomer is preferably chosen such that it is chemically unreactive toward the other components throughout their range of electroactivity in the battery.

The secondary battery of this invention can be charged and discharged in accordance with the procedure described in U.S. Pat. Nos. 4,321,114 and 4,602,492. Such procedures are well known to those of skill in the art and will not be described herein in any great detail The following specific examples are presented to more particularly illustrate the invention and are not to be construed as limitations therein.

COMPARATIVE EXAMPLE I

Sodium cobalt oxide of composition, $Na_{0.67}CoO_2$, was prepared in the P3 (beta) phase by reacting $Na_2O_2$ and $Co_3O_4$ in 1:1 molar proPortion in pelletized form at 550° C. for 16h in flowing dry oxygen. X-ray diffraction spectra taken on this powder confirmed that the oxide was in the P3 (or beta) phase. Scanning Electron Micrographs (SEM) taken on this powder revealed a globular morphology with a primary particle size in the range 0.1 to 0.4 microns.

COMPARATIVE EXAMPLE II

A cell was assembled using $Na_{0.67}CoO_2$ (P3) prepared according to Comparative Example I as a positive electrode. This electrode was fabricated from 82 percent by weight $Na_{0.67}CoO_2$, 10 w/o carbon black, and 8 w/o Teflon®. The cell was further comprised of a sodium metal negative electrode and an electrolyte of 1M $NaPF_6$ in dimethoxyethane (DME). The cell was cycled at a low rate equivalent to 0.2 mA/cm². Charge and discharge over the first few cycles exhibited an average capacity equivalent to a change in x, Delta x=0.47, for the composition, $Na_xCoO_2$ and essentially 100 percent by weight coulombic efficiency. The charge weighted average voltage differed by 0.06 V (2.77 and 2.71 V) which demonstrated some reduced energy efficiency.

EXAMPLE I

Sodium cobalt oxide of composition $Na_{0.67}CoO_2$ was prepared in the P2 (gamma) phase by reacting $Na_2CO_3$ and $Co_3O_4$ in 1:1 molar ratio in pelletized form at 750° C. for 16h in flowing dry oxygen. X-ray diffraction spectra taken on powder samples of this form confirmed that the oxide was in the P2 or (gamma) phase. SEM taken on the powder revealed particles having a plate-like morphology with particle size in the range 1 to 10 microns.

EXAMPLE II

A cell was assembled using $Na_{0.67}CoO_2$ (P2) prepared according to Example 2 as positive electrode. This electrode was fabricated from 82 w/o $Na_{0.67}CoO_2$, 10 w/o carbon black, and 8 w/o Teflon® The cell was further comprised of a sodium metal negative electrode an in electrolyte of 1M $NaPF_6$ in DME. The cell was cycled at a low rate equivalent to 0.2 mA/cm². Charge and discharge over the first few cycles exhibited a capacity equivalent to change in x, (delta) x=0.42, for the composition, $Na_xCoO_2$ and essentially 100 percent by weight coulombic efficiency. The charge weighted average voltage for charge and discharge was nearly identical (2.69 and 2.68 V respectively) demonstrating high energy efficiency.

COMPARATIVE EXAMPLE III

A cathode-limited cell was assembled using $Na_{0.67}CoO_2$ (P3) prepared according to Comparative Example I as cathode and polyphenylene (90 w/o) and polypropylene (10 w/o) as anode. The cell further contained a sodium reference and an electrolyte of 1M $NaPF_6$ in DME. The cell was charged and discharged over the voltage range 3.30 to 1.5 V at a rate equivalent to 2 mA/cm² until cycle number 170 and then at 1 mA/cm² until cycle number 225. The projected cycle life to a capacity equivalent to 50 percent by weight of the starting capacity was calculated to be 239 at 2 mA/cm² and 340 at 1 mA/cm2

EXAMPLE III

A cathode-limited cell was assembled using $Na_{0.67}CoO_2$ (P2) prePared according to Example II as cathode and a composite electrode comprised of 75 w/o $Na_{3.75}Pb$, 18 w/o polyphenylene, and 7 w/o polypropylene as anode. The cell also contained a sodium reference electrode and was filled with an electrolyte of 1M $NaPF_6$ in DME. The cell was charged and discharged in the voltage range 3.3 to 1.5 V at a constant current equivalent to 2 mA/cm² with respect to cathode area for about 290 cycles. The cell was also cycled in 1 mA/cm² for a few cycles around cycle numbers 1, 155, and 290. The Projected cycle life to a capacity equivalent to 50 percent by weight of the starting capacity was calculated to be 367 cycles at 2 mA/cm² or 997 cycles at 1 mA/cm2

A cathode limited cell was assembled using $Na_{0.67}CoO_2$ (P2) prepared according to Example II (80-85 weight percent (w/o)); carbon black (Shawinigan®) (814 10 w/o) and Teflon® (5-8 w/o). The positive electrode was pressed onto a platinm wire mesh current collector. The anode employed consisted of poly(p-phenylene)/$Na_xPb$ composites. The electrolyte was composed of 1M $NaPF_6$ in dimethoxyethane. The electrolyte was prepared from $NaPF_6$(Alfa) and dimethoxyethane distilled from sodium benzophenone. The 1M solution was stirred over a liquid Na-Hg amalgam in a final purification step. The test cell was held in sealed glass containers and was flooded with electrolyte. All of the fabrication steps were carried out in an argon-filled dry box The cell was cycled at a rate equivalent to 1 mA/cm² from 2.0 V to 3.5 V vs. Na/Na+and exhibited good cycle life, efficiency and capacity The cell was then cycled from 2.0 V to 4.0 V. The composition range over the charge/discharge cycles, x and energy density of this cells in side-by-comparison with corresponding data from Delmar et al. are set forth in the following Table I.

TABLE I

Performance of P2 Phase $Na_xCoO_2$[a]
Charged to 3.5 V vs. Na/Na+

| Cell | Composition Range | x | Energy Density |
|---|---|---|---|
| Delmar et al. | 0.46 < X < 0.83 | 0.37 | 260 Wg/Kg |
| Example IV | 0.51 < X < 0.93 | 0.42 | 283 Wg/Kg |
| Example IV[b] | 0.33 < X < 0.93 | 0.60 | 462 Wg/Kg |

[a]Based on weight of starting material of Delmar et al., $Na_{.7}CoO_2$.
[b]Charged to 4.0 V vs. Na/Na+.

What is claimed is:
1. An improved battery of the type which includes a cathode means, an anode means and an electrolyte, the improvement comprising a cathode means comprising

$Na_xCoO_2$ in the P2 phase characterized in that the change in x during a charge/discharge cycle, $\Delta x$, is greater than about 0.37.

2. A battery according to claim 1 $\Delta x$ during the charge/discharge cycle is equal to or greater than about 0.40.

3. A battery according to claim 2 wherein $\Delta x$ during the charge/discharge cycle is equal to or greater than about 0.42.

4. A battery according to claim 3 wherein $\Delta x$ during the charge/discharge cycle is equal to or greater than about 0.42.

5. A battery according to claim 1 wherein said cathode comprises particulate sodium cobalt dioxide dispersed in a polymeric binder.

6. A battery according to claim 4 wherein said binder is selected from the group consisting of halopolymers and elastomeric materials.

7. A battery according to claim 5 wherein said binder is a halopolymer.

8. A battery according to claim 6 wherein said binder is an elastomeric material.

9. A battery according to claim 8 wherein said elastomeric material is selected from the group consisting of hydrocarbon elastomers, polyethers, aliphatic polyesters, and copolymers of ethylenically unsaturated ethers, esters, and ketones.

10. A battery according to claim 9 wherein said elastomeric material is selected from the group consisting of hydrocarbon elastomers and polyether elastomers.

11. A battery according to claim 10 wherein said elastomeric material is selected from the group consisting of hydrocarbon elastomers.

12. A battery according to claim 11 wherein said hydrocarbon elastomers include cross-linkable moieties.

13. A battery according to claim 12 wherein said moieties are double bonds in the polymeric backbone or pendant double bonds.

14. A battery according to claim 13 wherein said hydrocarbon elastomers are selected from the group consisting of polymers or copolymers of diene monomers.

15. A battery according to claim 14 wherein said diene monomers are selected from the group consisting of substituted or unsubstituted 1,3-butadiene.

16. A battery according to claim 14 wherein said hydrocarbon elastomers are selected from the group consisting of copolymers formed by copolymerization of one or more olefins and one or more 1,3-butadienes 17. A battery according to claim 16 wherein said hydrocarbon elastomer is ethylene/propylene/butadiene copolymer.

18. A battery according to claim 1 having a charge/discharge cycle life of greater than 239 cycles to a capacity equivalent to 50 percent of the initial capacity of said battery.

19. A battery according to claim 18 wherein said charge/discharge cycle life is at least about 367 cycles.

20. A battery according to claim 18 wherein $\Delta x$ during the initial charge/discharge cycle is equal to or greater than about 0.42.

21. A battery according to claim 19 wherein $\Delta x$ during the initial charge/discharge cycle is equal to or greater than about 0.42.

22. A battery according to claim 18 wherein $\Delta x$ during the initial charge/discharge cycle is equal to or greater than about 0.60.

23. A battery according to claim 19 wherein $\Delta x$ during the initial charge/discharge cycle is equal to or greater than about 0.60.

24. A battery comprising:

(a) one or more anode active materials selected from the group consisting of sodium metal, conjugated backbone polymers capable of inserting sodium cations, alloys of sodium metal, sodium cation inserting materials and a combination of any of the foregoing;

(b) an electrolyte comprising one or more organic solvents and a sodium salt; and (c) a cathode comprising sodium cobalt dioxide $Na_xCoO_2$ in the $P_2$ phase characterized in that the change in x during a charge/discharge cycle, $\Delta x$, is greater than about 0.37; during the charging of said battery said sodium metal cations from said electrolyte being incorporated into said anode as a metal alloy or as an inserted cation in said sodium cation inserting material or said conjugated polymer, and sodium in said sodium cobalt dioxide being released into said electrolyte, and during the discharge of said battery said sodium in said alloy, in said sodium-ion inserting material or in said polymer being released into said electrolyte and sodium cations in said electrolyte being inserted into said sodium cobalt dioxide.

25. A battery according to claim 1 wherein $\Delta x$ during the charge/discharge cycle and is equal to or greater than about 0.40.

26. A battery according to claim 19 wherein $\Delta x$ during the charge/discharge cycle is equal to or greater than about 0.42.

27. A battery of claim 1 or claim 18 wherein said $Na_xCoO_2$ in the P2 phase is synthesized from sodium carbonate and cobalt (II, III) oxide.

28. A battery according to claim 18 having a charge/discharge cycle life of greater than 239 cycles to a capacity equivalent to 50 percent of the initial capacity of said battery.

29. A battery according to claim 28 wherein said anode active material is sodium metal or an alloy of sodium metal and wherein said battery is charged and discharged in a voltage range of from about 3.3 to about 1.5 V.

30. A battery according to claim 28 wherein $\Delta x$ during the initial charge/discharge cycle is equal to or greater than about 0.42.

31. A battery according to claim 28 wherein $\Delta x$ during the initial charge/discharge cycle is equal to or greater than about 0.60.

32. A method of charging and discharging a secondary battery of the type which comprises a cathode means comprising $Na_xCoO_2$ in the P2 phase where the change in x during the initial charge/discharge cycle, $\Delta x$, is greater than about 0.37, said method comprising:

charging and discharging said battery through more than one charge/discharge cycles to a capacity equivalent to about 50 percent of the capacity of said battery at the initial charging cycle.

33. The method according to claim 32 which comprises charging and discharging said battery for more than about 239 cycles.

34. A method according to claim 33 which comprises charging and discharging said battery for at least about 367 cycles.

35. A method according to claim 32 wherein $\Delta x$ during the initial charge/discharge cycle is equal to or greater than about 0.42.

36. A method according to claim 32 wherein $\Delta x$ during the initial charge/discharge cycle is equal to or greater than about 0.60.

37. A method according to claim 32 wherein $\Delta x$ during the initial charge/discharge cycle is equal to or greater than about 0.60.

* * * * *

UNITED STATES PATENT AND TRADEMARK OFFICE
CERTIFICATE OF CORRECTION

PATENT NO. : 5,011,748

DATED : April 30, 1991

INVENTOR(S) : L.W. Shacklette, L.B. Townsend and T.R. Jow

It is certified that error appears in the above-identified patent and that said Letters Patent is hereby corrected as shown below:

Col. 11, line 15: "4" should read --5--.

Signed and Sealed this

Twentieth Day of April, 1993

Attest:

MICHAEL K. KIRK

*Attesting Officer*　　　　Acting Commissioner of Patents and Trademarks